United States Patent [19]

Eroskey et al.

[11] Patent Number: 4,769,202
[45] Date of Patent: Sep. 6, 1988

[54] PROCESS OF MAKING A CONVEYOR BELT

[75] Inventors: Richard E. Eroskey, Munroe Falls; Winthrop S. Worcester, Akron, both of Ohio

[73] Assignee: The B. F. Goodrich Company, Akron, Ohio

[21] Appl. No.: 70,768

[22] Filed: Jul. 7, 1987

Related U.S. Application Data

[60] Division of Ser. No. 802,918, Nov. 29, 1985, which is a continuation-in-part of Ser. No. 769,295, Aug. 26, 1985, abandoned.

[51] Int. Cl.⁴ .................. B29C 41/28; B29C 41/30; B29C 47/02; B65G 15/34
[52] U.S. Cl. .................. 264/166; 156/177; 156/178; 156/246; 156/440; 264/171; 264/174; 264/216; 425/115; 425/122; 425/123; 425/818; 428/229; 428/257; 428/258; 428/369; 428/394
[58] Field of Search .......... 264/103, 216, 229, 257, 264/279.1, 166, 231, 171, 174; 425/115, 122, 123, 818; 156/161, 177, 178, 246, 440; 198/847; 428/229, 257, 258, 369, 375, 392, 394, 395

[56] References Cited

U.S. PATENT DOCUMENTS

| | | | |
|---|---|---|---|
| 1,923,710 | 8/1933 | Collings | 156/440 |
| 2,425,575 | 8/1947 | Suloff | 428/258 X |
| 2,828,795 | 4/1958 | Hartstein | 156/440 |
| 3,007,205 | 11/1961 | House | 264/171 |
| 3,278,667 | 10/1966 | Knox | 264/171 |
| 3,301,932 | 1/1967 | Chisholm | 264/174 |
| 3,415,700 | 12/1968 | Webster | 156/178 X |
| 3,441,641 | 4/1969 | Roberts | 264/229 |
| 3,443,003 | 5/1969 | Anderson | 264/171 |
| 3,509,006 | 4/1970 | Baxendale et al. | 198/847 X |
| 3,615,152 | 10/1971 | Bouzat et al. | 198/847 |
| 3,616,129 | 10/1971 | Sager | 156/178 X |
| 3,616,496 | 11/1971 | Anglioletti et al. | 425/122 X |
| 3,791,900 | 2/1974 | Goerden et al. | 156/440 X |
| 3,876,485 | 4/1975 | Kinlock et al. | 156/246 |
| 3,917,439 | 11/1975 | Yovanovich | 425/4 C |
| 3,972,667 | 8/1976 | Hanusa | 425/817 C |
| 3,973,670 | 8/1976 | Spaar | 198/847 |
| 4,064,915 | 12/1977 | Buyssens et al. | 198/847 X |
| 4,094,402 | 6/1978 | Heeke | 198/847 |
| 4,165,955 | 8/1979 | Morgan | 425/817 C |
| 4,209,089 | 6/1980 | Day | 198/847 |
| 4,216,177 | 8/1980 | Otto | 425/4 C X |
| 4,226,417 | 10/1980 | Camilleri | 198/847 X |
| 4,375,920 | 3/1983 | Wurm et al. | 198/813 X |

FOREIGN PATENT DOCUMENTS

| | | | |
|---|---|---|---|
| 40360 | 12/1909 | Austria | 156/440 |
| 1161385 | 1/1984 | Canada | 198/847 |
| 74325 | 3/1983 | European Pat. Off. | 264/257 |
| 2446876 | 9/1980 | France | 264/167 |
| 826412 | 1/1960 | United Kingdom | 264/257 |
| 2009270 | 6/1979 | United Kingdom | 264/174 |

*Primary Examiner*—Jeffery Thurlow
*Assistant Examiner*—Leo B. Tentoni
*Attorney, Agent, or Firm*—Joseph Januszkiewicz

[57] ABSTRACT

An apparatus and method for producing a conveyor belt made of urethane having reinforcement embedded therein which reinforcement permits the stretching of the belt under controlled conditions. The reinforcement consists of a fabric or a plurality of aligned strands that are embedded in the urethane body of the belt proper that allow for a controlled stretch in the conveyor belt until such fabric or cords limit the stretching of such belt.

9 Claims, 5 Drawing Sheets

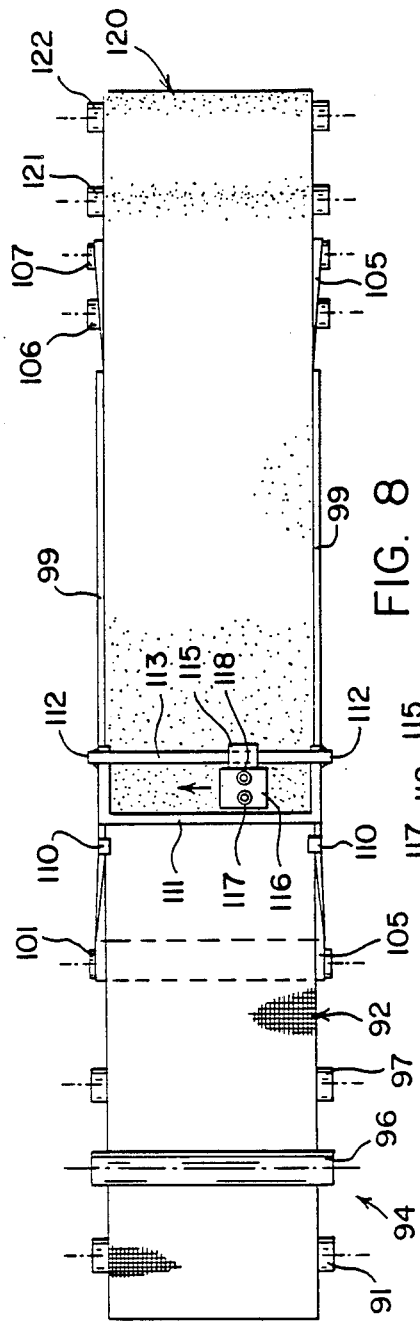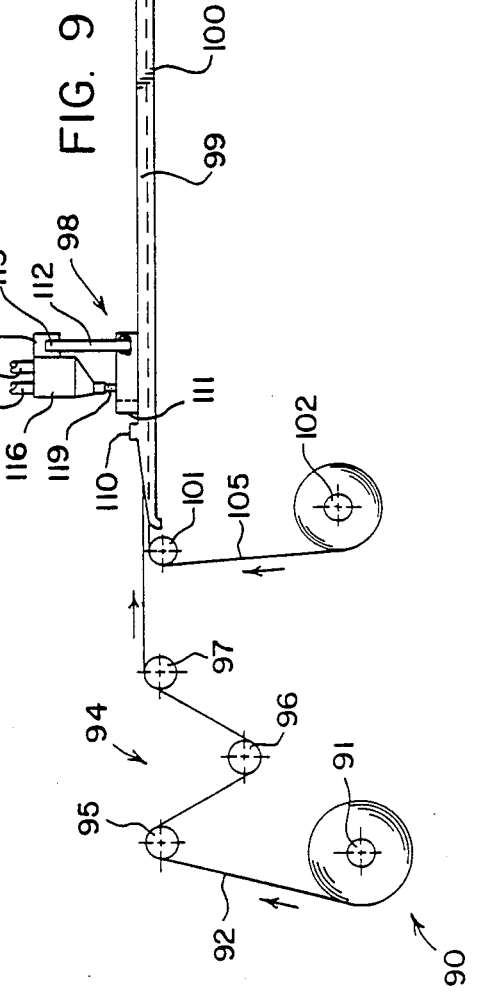

PROCESS OF MAKING A CONVEYOR BELT

This is a division, of application Ser. No. 06/802,918, filed Nov. 29, 1985, which is a continuation-in-part of application Ser. No. 06/769,295, filed Aug. 26, 1985, now abandoned.

DISCLOSURE OF THE INVENTION

This invention relates to a conveyor belt product, a method and an apparatus for the manufacture of such a conveyor belt that is reinforced with longitudinally extending cords which allow the belt to stretch a predetermined amount.

Conveyor belts made of polyurethane are used in the food industries because of their ability to handle food without contamination. Such belts can be cleaned and sanitized easily and accordingly have been approved for use in the handling of food; however, such use has had a practical limitation because the belts stretch too much. The present invention has provided means for limiting such stretch thereby enhancing their practical application in handling food. A plurality of cords in lateral spaced alignment are embedded into the body proper of the polyurethane belt with such cords being disposed in a wave or serpentine pattern such that as the belt stretches in a longitudinal direction, the stretch is limited by the alignment of the cords into parallel linear alignment. The degree of stretch can be controlled initially by the degree of non-linear placement of the cords. By increasing the wave or serpentine pattern of the cords, the stretch can be increased. As the belt stretches, the cords will move from a non-linear position slowly into a linear position, which linear position is the extent of the belt stretch. Since there are no exposed fabric plies in the present invention, the belt will not abraid if it rides on the edge guides. In view of the fact that the polyurethane is transparent, it allows for visual inspection through the belt for foreign matter that may get trapped under the belt on the conveyor system thus making it highly desirable for use in handling food products. The conveyor belt of the invention is homogeneous throughout and will not have ply separation or top cover delamination as has been the case of prior constructed belts. The belt of this invention has excellent belt tracking due to the uniform cord tension in comparison to possible non-uniform tension in plied-up rubber conveyor belts having numerous plies. Another important advantage of the present invention is the ease with which the belt strength can be adjusted or varied by changing the type of yarn, yarn strength, or fabric weave.

SUMMARY OF THE INVENTION

The present invention provides an apparatus and method that produces a novel conveyor belt made of polyurethane wherein strands of material are disposed in the belt body proper to allow for a limited stretching of the belt. The strands are given a wavy or serpentine preform which allows the desired stretch to the conveyor belt. As an alternative, a single fabric ply with sufficient wavy resiliency in its weave is cast within the body of the polyurethane belt to provide for a limited stretching of the conveyor belt. By controlling the degree or amount of wave of the parallel strand, the extent of the longitudinal stretch can be limited. Maintaining the strands in perfect parallel alignment would allow no stretch whereas with the wavy disposition of the strands in the belt, the stretch can occur until the wavy strands become linear in disposition. A modification of the wavy strands is to provide strands of fibers that are linear in disposition but have limited stretch in the longitudinal direction and are embedded in the polyurethane to control the stretch.

BRIEF DESCRIPTION OF THE DRAWINGS

FIG. 8 is a schematic plan view of a modified form of the apparatus for the production of a modified form of the reinforced conveyor belt;

FIG. 9 is a schematic side elevational view of the apparatus shown in FIG. 8;

DETAILED DESCRIPTION

Figure 1:
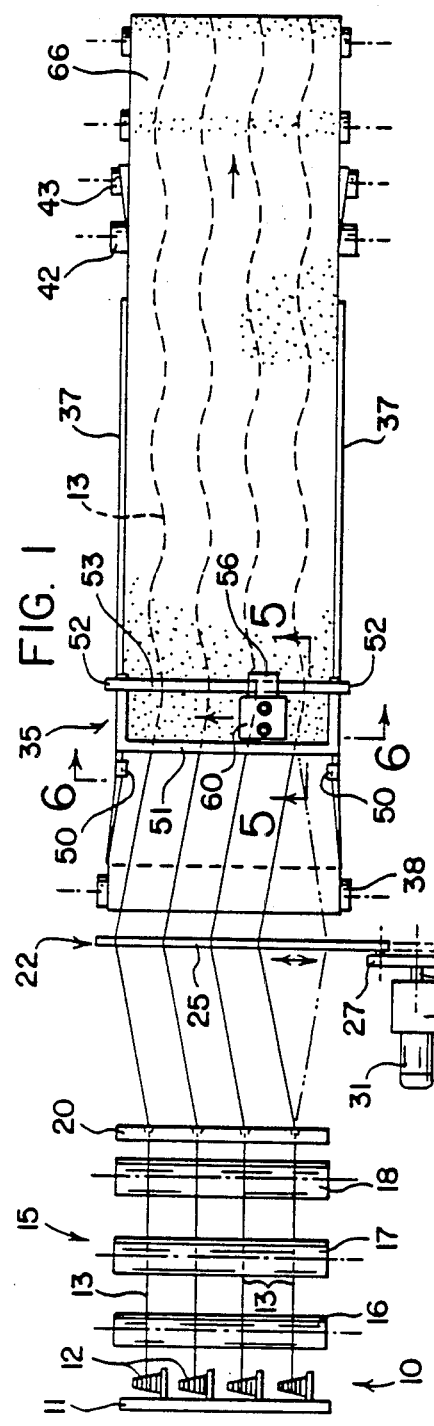
FIG. 1 is a schematic plan view of the apparatus for the production of a reinforced conveyor belt.
Figure 2:
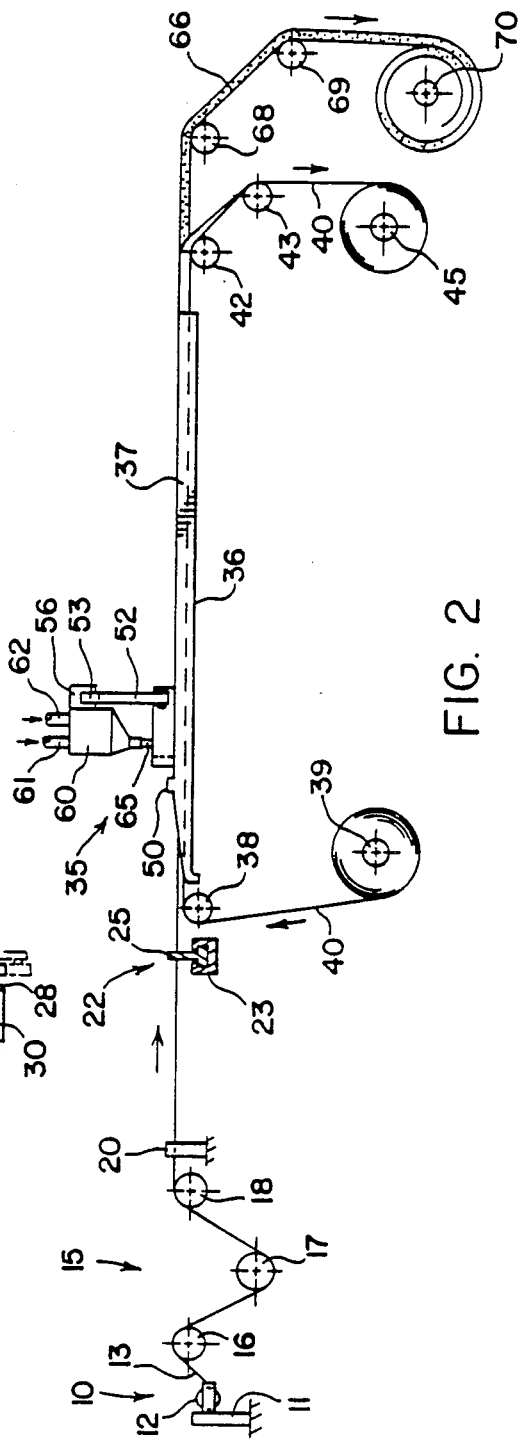
FIG. 2 is a schematic side elevational view of the apparatus for the production of the conveyor belt shown in FIG. 1.
Figure 3:
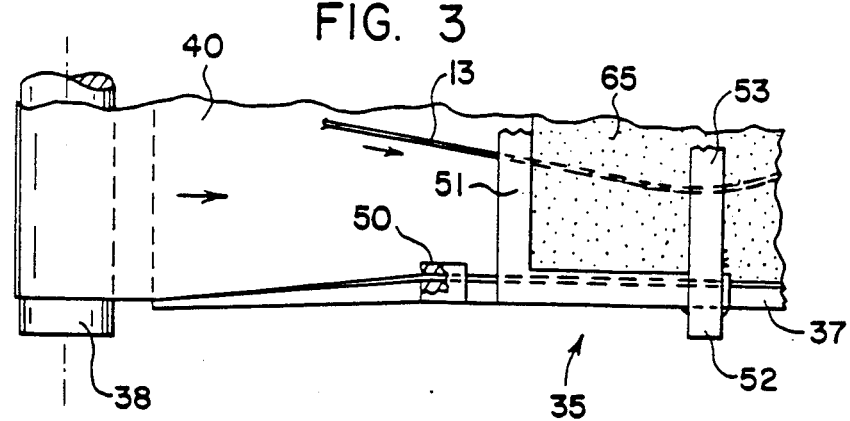
FIG. 3 is a partial plan view of the cords being embedded within the polyurethane which is being cast onto a moving carrier.
Figure 4:
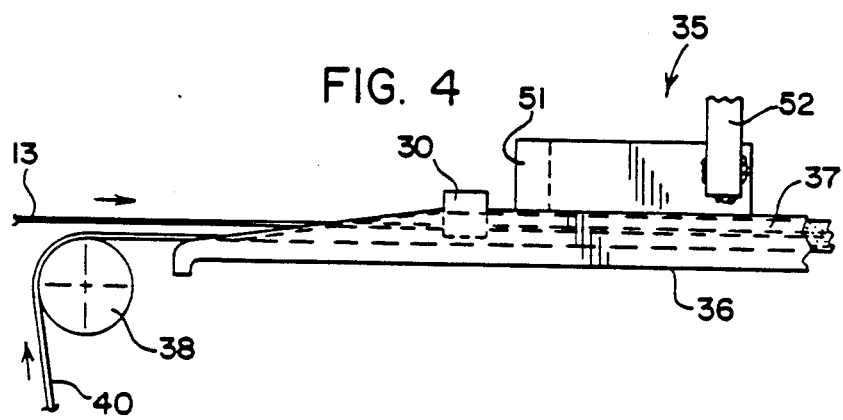
FIG. 4 is a partial side elevational view of the conveyor belt being formed as shown in FIG. 3.
Figure 5:
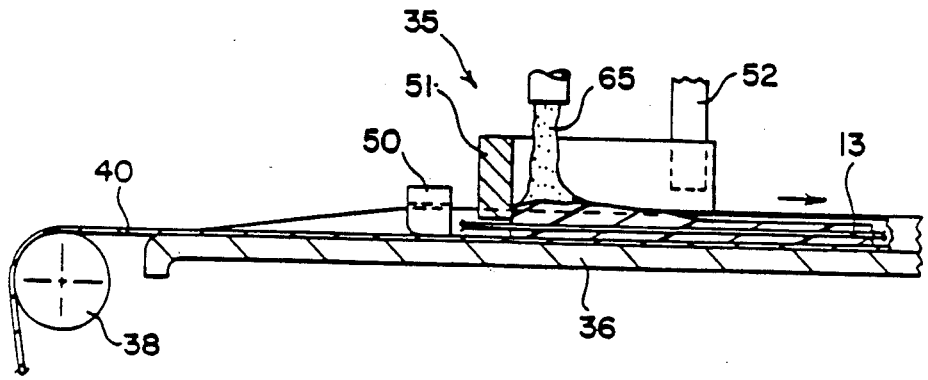
FIG. 5 is a cross-sectional view of the pouring head casting the conveyor belt taken on line 5—5 of FIG. 1.

Referring to the drawings wherein like reference numerals designate like or corresponding parts throughout the several views, there is shown in FIGS. 1 and 2 a cord let-off means 10 having support means 11 supporting a plurality of bobbins 12 which feed strands of cords 13 to a tension control means 15. Tension means 15 includes a plurality of rollers 16-17-18 disposed on suitable supports not shown. One of such rollers 17 may be a dancer roll to facilitate the tension control. Such dancer rolls are old and well known in the art.

A guide bar 20 with a plurality of apertures in lateral alignment operate to guide the cords 13 from the tension control means 15 to a cord alignment device 22. Device 22, as shown in FIGS. 1 and 2, includes a fixed or stationary guide bar 23 having a T-shaped slot that receives a movable member or bar 25. Bar 25 has a plurality of laterally spaced apertures that permit the passage of the laterally spaced cords 13. Movable member 25 is pivotally connected off-center to a crank or cam 27. Cam 27 is suitably keyed to a shaft 28 that has been connected to the output of a gear box 30, which gear box 30 is driven from a motor 31.

Mounted forwardly of the cord alignment device 22 is a box-type belt molding device or conveyor belt forming device 35 that is mounted on spaced side rails 37 of a longitudinally extending table 36. Such conveyor belt forming device 35 is adjustably mounted thereon in a manner well known in the art.

Mounted at the receiving or one end of the table 36 is a guide roll 38 and a supply roll 39. Supply roll 39 has a flexible film or carrier means 40 wound up thereon which is fed over roll 38 for movement over table 36. Film or carrier 40 is of greater width than the table 36 such that the respective side edges of the carrier 40 are turned upwardly along the respective side rails 37. The carrier means 40 moves over the table 36 and thence over guide rolls 42 and 43 at the discharge end or the other end of the table 36 for windup onto a take up roll 45.

Figure 6:
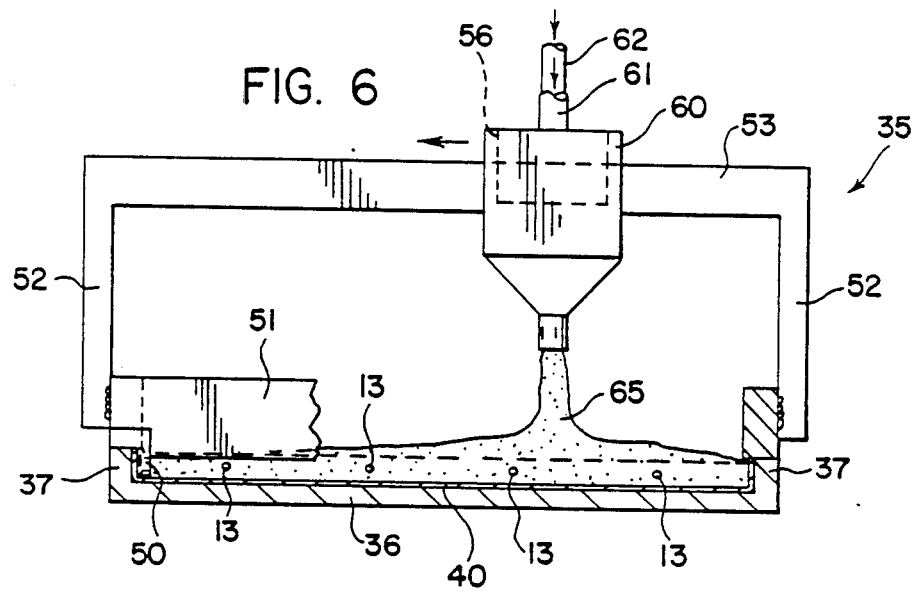
FIG. 6 is a side elevational view partly in section taken on line 6—6 of FIG. 1.
Figure 7:
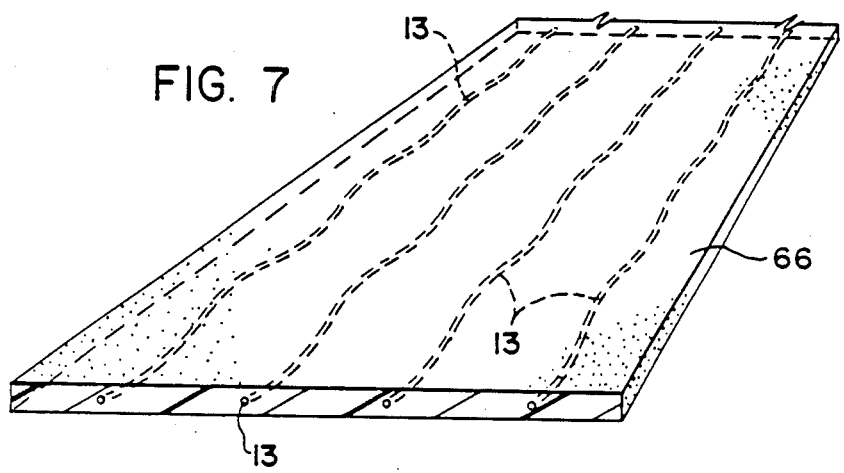
FIG. 7 is a perspective view of a section of a conveyor belt showing the serpentine or wavy disposition of cords embedded within the belt.

Associated with belt molding device 35 are a pair of laterally spaced guide means 50 to fold up the side edges of the carrier 40 as it is fed towards the belt molding device 35 and onto table 36. The carrier member 40 is adapted to move longitudinally on the table between the table 36 and the belt molding device 35. The belt molding device 35 (FIGS. 3-6) has a forwardly disposed plate or side 51 spaced upwardly from the table 36 to allow for the passage of the laterally aligned cords 13 thereinto. The molding device 35 is open along the rear side for the full width of the table 36 to allow for the passage of the belt being formed along with the carrier means or film 40. A pair of laterally spaced, vertically extending braces 52 are suitably secured to the sides (FIG. 6) of the belt molding device 35 to support a guide rail 53 at their upper ends. As seen in FIGS. 2 and 6, the uppermost portion of such guide plate 53 is slidingly received by a recess in a movable support 56 which supports a mixing and pouring head 60.

A pair of conduits 61 and 62 are connected to the mixing head 60 for conducting the ingredients to the mixing head 60 which in turn discharges from its lower end the liquid polyurethane 65 (FIG. 6) which forms the conveyor belt designated 66 (FIG. 2) downstream from the mixing head 60. The liquid polyurethane is molded into a rectangular configuration as it leaves the belt molding device 35 and its width is determined by the lateral spacing of the upturned sides of the film or carrier 40. The liquid polyurethane quickly solidifies in the belt molding device 35 to capture the serpentine configuration of the cords 13. The table 36 is heated as by a plurality of steam pipes extending through the table to facilitate the controlled heating thereof which action accelerates the solidifying of the belt being formed, which solidification is completed as it travels on the table 36 via carrier means 40.

As the newly formed reinforced conveyor belt 66 is discharged from the table 36, the carrier member or film 40 is separated from the conveyor belt 66 and fed over rolls 42 and 43 onto the take-up roll 45 while conveyor belt 66 is guided over rolls 68 and 69 for wind-up on roll 70.

The polyurethane used to make the conveyor belt can be any conventional or common urethane known to the art having a low molecular weight polymer basic intermediate with hydroxyl end group. This may be a polyester, a polyether, or a mixed polyester-polyamide and polycaprolactone. The basic intermediate is reacted with a diisocyanate, preferably an aromatic diisocyanate, to yield a prepolymer. Numerous diisocyanates can be utilized such as 2,4-tolylene diisocyanate, 4,4-diphenylmethane diisocyanate, and the like. The urethane or polyurethane embeds the cords 13 in the instant case and is cured by chain extension which results from a reaction between the isocyanate end groups and a curing agent such as a glycol, diamine, diacid, or an amino alcohol.

The cords used include steel or Kevlar ® or polyester and/or blends of polyester and blends of cotton which has very low stretch but great strength.

In the fabrication of the conveyor belt 66, the film or carrier member 40 is fed onto the heated table 36 towards the belt molding device 35 as a plurality of laterally spaced cords 13 are fed from the spools or bobbins 12 into the belt molding device 35. The table 36 can be heated by steam to accelerate cure of the belt being formed. The cords 13 are given a slow oscillating motion in a horizontal plane by the oscillating device 22 and cam 27. Such action by device 22 will cause the cords 13 to be embedded into the polyurethane body being formed in the belt molding device 35 in a sine wave whose wave magnitude and frequency can be varied to alter the percentage of stretch permitted to the belt. The cords 13 are embedded in the belt 66 as it quickly gels and cures on the heated table 36. The conveyor belt is cooled as it travels downstream on the table 36 while being transported by the carrier means or member 40. The cured reinforced polyurethane belt is wound up onto roll 70. Such polyurethane belt can be spliced into an endless belt in any of a number of known splicing methods which includes a mechanical splice or a cured finger splice wherein alternate projections are mated and spliced.

A modification of the described embodiment is substantially as described above except that cord alignment device 22 is retained in a stationary, non-oscillatory mode such that the cords 13 are fed in parallel linear alignment to the belt molding device 35 wherein the cords 13 are fed for embedding into the belt being formed without being given a wavy or serpentine configuration. As described above, the liquid polyurethane is molded into a rectangular configuration as it leaves the belt molding device 35 and its width is determined by the lateral spacing of the upturned sides of the carrier 40 with the parallel linear cords 13 embedded therein. The liquid polyurethane quickly solidifies in the belt molding device 35 capturing the linear disposition of the cords 13. In this instance, the cords 13, being formed from a group of filaments that had been twisted together, have some resiliency or stretch in the longitudinal direction and accordingly, when embedded in the polyurethane belt, provide a limited stretch to the belt so formed. As in the first embodiment, the cured reinforced polyurethane belt is wound up onto roll 70.

Figure 10:
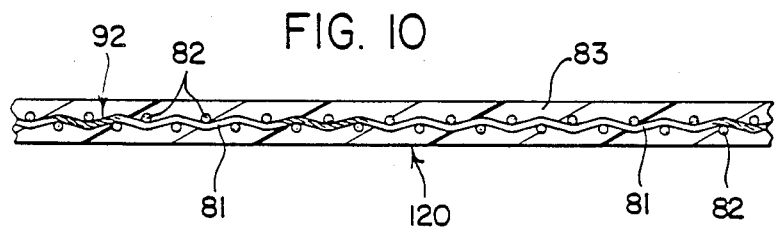
FIG. 10 is a cross-sectional view on an enlarged scale of a woven fabric embedded in a polyurethane belt.
Figure 11:
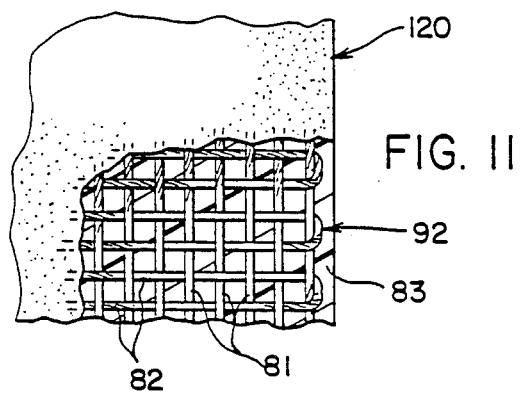
FIG. 11 is an enlarged plan view of the modified form of the conveyor belt shown in FIG. 10 with a portion of the polyurethane removed to show the textile woven fabric.

A modified form of the conveyor belt is shown in FIGS. 10 and 11 wherein a fabric 92 is shown as comprised of warp threads 81 and weft threads 82 embedded in a polyurethane body 83. As seen in FIG. 10, the warp threads 81 have a slight sinusoidal pattern such that it will permit a stretching of the fabric in a longitudinal direction. If a greater stretch is desired in the fabric, the weave can be adjusted to provide for the desired stretch.

The apparatus for manufacturing the conveyor belt includes a fabric let-off roll 90 mounted on a shaft 91 which feeds fabric 92 through a tension control means 94. Such control means 94 includes a plurality of rollers 95-96-97 disposed on suitable support means not shown. One of such rollers 96 may be a dancer roll to facilitate the tension control. Such dancer rolls are old and well known in the art.

Mounted forwardly of the roller 97 is a box-type belt molding device or conveyor belt forming device 98 that is mounted on spaced side rails 99 of a longitudinally extending table 100. Such conveyor belt forming device 98 is adjustably mounted on rails 99 in a manner well known in the art.

Mounted at the receiving or one end of the table 100 is a guide roll 101 and a supply roll 102. Supply roll 102 has a flexible film or carrier means 105 wound thereon which film 105 is fed over roll 101 for movement over table 100. Film or carrier 105 is of greater width than the table 100 such that the respective side edges of the barrier means or film 105 are turned upwardly along the respective side rails 99. The carrier means 105 moves over the table 100 and thence over guide rolls 106 and 107 at the discharge end or the other end of the table 100 for windup onto a take up roll 108.

Associated with belt molding device 98 are a pair of laterally spaced guide means 110 to fold up the side edges of the film 105 as it is fed towards the belt molding device 98 and onto table 100. The carrier means 105 is adapted to move longitudinally on the table and between the table 100 and the belt molding device 98. The belt molding device 98 (FIGS. 8 and 9) has a forwardly disposed plate or side 111 spaced upwardly from the table 100 to allow for the passage of the fabric 92 and carrier means 105 thereinto. The molding device 98 is open along the rear side for the full width of the table 100 to allow for the passage of the belt being formed along with the carrier means or film 105. A pair of laterally spaced, vertically extending braces 112 are suitably secured to the sides of the belt molding device 98 to support a guide rail 113 at their upper ends. As seen in FIG. 9, the uppermost portion of such guide rail 113 is slidingly received by a recess in a movable support 115 which supports a mixing and pouring head 116.

A pair of conduits 117 and 118 are connected to the mixing head 116 for conducting the ingredients to the mixing head 116 which in turn discharges from its lower end the liquid polyurethane 119 (FIG. 9) which forms the polyurethane body 83 of the conveyor belt designated 120 downstream from the mixing head 116. The liquid polyurethane is molded into a rectangular configuration as it leaves the belt molding device 98 and its width is determined by the lateral spacing of the upturned sides of the film or carrier 105. The liquid polyurethane quickly solidifies in the belt molding device 98 to embed the fabric 92. Embedded is defined as completely surrounding the subject as wherein the fabric 92, as used herein, is completely surrounded on all sides by the polyurethane 83, including the top and bottom sides. The table 100 is heated as by a plurality of steam pipes extending through the table to facilitate the controlled heating thereof which action accelerates the solidifying of the belt being formed, which solidification is completed on the carrier 105 as the belt travels on the table 100 via carrier means 105.

As the newly formed reinforced conveyor belt 120 is discharged from the table 100, the carrier member or film 105 is separated from the conveyor belt 120 and fed over rolls 106 and 107 onto the take-up roll 108 while conveyor belt 120 is guided over rolls 121 and 122 for wind-up on roll 123.

The polyurethane used to make the conveyor belt in this modification is the same as described in the initial embodiment.

The fabric used includes Kevlar ® cord or polyester and/or blends of polyester and blends of cotton which has very low stretch but great strength.

In the fabrication of the conveyor belt 120, the film or carrier member 105 is fed onto the heated table 100 towards the belt molding device 98 as the fabric 92 is fed from the shaft 91 into the belt molding device 98. The table 100 can be heated by steam to accelerate cure of the belt being formed. The fabric is maintained at a constant tension by the dancer roll 96 as the fabric 92 is embedded into the polyurethane body being formed in the belt molding device 98. The fabric is embedded in the belt 120 as it quickly gels and cures on the heated table 100. The conveyor belt 120 is then cooled as it travels downstream on the table 100 while being transported by the carrier means or member 105. The cured reinforced polyurethane belt is wound up onto roll 123. Such polyurethane belt can be spliced into an endless belt in any of a number of known splicing methods which include a mechanical splice or a cured finger splice wherein alternate projections are mated and spliced. The conveyor belt has a limited stretch as determined or permitted by the non-linear configuration of the warp threads 81 in the fabric 92. As such threads 81 in the fabric 92 reach their limit of stretch, the fabric 92 reinforces the conveyor's belt limit of stretch and provides an effective means to reinforce the belt's strength due to its uniform cord tension. The conveyor belt's strength can be controlled and varied by changing the number of yarns and yarn strength as well as weave.

It will be apparent that, although a specific embodiment and certain modifications of the invention have been described in detail, the invention is not limited to the specifically illustrated and described constructions since variations may be made without departing from the principles of the invention as set forth in the appended claims.

We claim:

1. A method of making a reinforced conveyor belt comprising the steps of feeding a single ply fabric in a longitudinal direction wherein said fabric has a plurality of warp cords disposed in a non-linear path that is parallel to said longitudinal direction, pouring a quick setting liquid polyurethane onto a moving carrier member, embedding said fabric into said liquid polyurethane along the mid center thereof, curing said liquid polyurethane to form a polyurethane with said fabric embedded along the mid center thereof to provide a limited stretch to said polyurethane belt as limited by said warp codes of said fabric in said belt.

2. The method of making a reinforced conveyor belt as set forth in claim 1, wherein said fabric has weft cords woven in with said warp cords to provide said limited stretch to said belt.

3. A method of making a reinforced polyurethane conveyor belt comprising the steps of directing a plurality of parallel cords in laterally spaced alignment along a horizontal plane in a longitudinal direction, imparting a non-linear wavy configuration in a horizontal plane to said cords as said cords are delivered to a moving belt forming mold, embedding said cords in said non-linear configuration along a horizontal plane in a gelling liquid polyurethane body that is delivered to said moving mold, and curing said liquid polyurethane body with said cords embedded therein in said non-linear wavy configuration that lie in a single horizontal plane that lies along the central mid plane of said belt as said belt is discharged from said moving belt mold.

4. The method of making a reinforced polyurethane belt as set forth in claim 3 wherein said imparting of a non-linear configuration is a sine-wave configuration.

5. The method of making a reinforced polyurethane belt as set forth in claim 4 wherein said liquid polyurethane is a low molecular weight polymer basic intermediate with a hydroxyl end group that solidifies into a transparent solid.

6. The method of making a reinforced polyurethane belt as set forth in claim 5 wherein said imparting of a non-linear configuration is provided to limit the stretching of said cured polyurethane belt to 10 percent of its original length.

7. The method of making a reinforced polyurethane belt as set forth in claim 6 wherein said directing of cords are textile cords.

8. A method of making a reinforced conveyor belt comprising the steps of directing a plurality of laterally spaced cords in a longitudinal direction, feeding a carrier member with side portions in said longitudinal direction, imparting a serpentine configuration to said cords while feeding in said longitudinal direction, pouring a quick setting polyurethane onto said carrier member while embedding said cords therein along a horizontal plane, and curing said polyurethane while embedding said cords therein with said serpentine configuration and with said cords lying in said horizontal plane.

9. A method of making a reinforced conveyor belt as set forth in claim 8 wherein said cords are fed in said longitudinal direction along said horizontal plane that is equidistant from the top surface and bottom surface of the formed conveyor belt.

* * * * *